United States Patent
Ramsay et al.

(10) Patent No.: US 10,620,339 B2
(45) Date of Patent: Apr. 14, 2020

(54) STATIC EARTH MODEL CALIBRATION METHODS AND SYSTEMS USING TORTUOSITY EVALUATIONS

(71) Applicant: LANDMARK GRAPHICS CORPORATION, Houston, TX (US)

(72) Inventors: Travis St. George Ramsay, Rosenberg, TX (US); Dominic Camilleri, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 389 days.

(21) Appl. No.: 14/913,985

(22) PCT Filed: Aug. 29, 2013

(86) PCT No.: PCT/US2013/057415
§ 371 (c)(1),
(2) Date: Feb. 23, 2016

(87) PCT Pub. No.: WO2015/030782
PCT Pub. Date: Mar. 5, 2015

(65) Prior Publication Data
US 2016/0209546 A1    Jul. 21, 2016

(51) Int. Cl.
*G01V 99/00* (2009.01)
*G05B 17/02* (2006.01)

(52) U.S. Cl.
CPC .......... *G01V 99/005* (2013.01); *G05B 17/02* (2013.01)

(58) Field of Classification Search
USPC ....................................................... 700/282
See application file for complete search history.

(56) References Cited

U.S. PATENT DOCUMENTS 6,549,879 B1 * 4/2003 Cullick .................. E21B 49/00
                                                      702/11
7,096,122 B2    8/2006 Han
(Continued)

FOREIGN PATENT DOCUMENTS

WO    2015/030872       3/2015
WO    2015030754 A1     3/2015

OTHER PUBLICATIONS

Yu, Xinghe, Y. Zee Ma, David Psaila, Paul La Pointe, Ernest Gomez, and Shengli Li, (herein Yu et al.) (Reservoir characterization and modeling: A look back to see the way forward, in Y. Z. Ma and P. R. La Pointe, eds., Uncertainty analysis and reservoir modeling: AAPG Memoir 96, p. 289-309, 2011), (Year: 2011).*

(Continued)

*Primary Examiner* — Roy Y Yi
(74) *Attorney, Agent, or Firm* — Gilliam IP PLLC (57) ABSTRACT

At least some of the disclosed systems and methods obtain a static earth model having a three-dimensional grid with multiple cells. Further, at least some of the disclosed systems and methods determine a plurality of geobodies for the static earth model, each geobody comprising a plurality of connected cells. Further, at least some of the disclosed systems and methods compute one or more tortuosity values for at least one of the plurality of geobodies. Further, at least some of the disclosed systems and methods calibrate the static earth model based on the one or more computed tortuosity values. Further, at least some of the disclosed systems and methods use the calibrated static earth model as input to a flow simulator.

14 Claims, 10 Drawing Sheets

(56) References Cited

U.S. PATENT DOCUMENTS

| | | | |
|---|---|---|---|
| 8,327,936 B2* | 12/2012 | Coskuner | E21B 43/2406 166/272.3 |
| 2005/0234690 A1 | 10/2005 | Mainguy et al. | |
| 2009/0089028 A1 | 4/2009 | Sagert et al. | |
| 2010/0057418 A1 | 3/2010 | Li et al. | |
| 2010/0076738 A1 | 3/2010 | Dean et al. | |
| 2010/0125349 A1 | 5/2010 | Abasov et al. | |
| 2010/0161292 A1 | 6/2010 | Shook et al. | |
| 2011/0015912 A1* | 1/2011 | Oppert | G01V 99/00 703/10 |
| 2013/0035913 A1 | 2/2013 | Mishev et al. | |
| 2013/0073268 A1 | 3/2013 | Abacioglu et al. | |
| 2013/0338984 A1 | 12/2013 | Braaksma et al. | |
| 2016/0231462 A1 | 8/2016 | Ramsay | |

OTHER PUBLICATIONS

Kasap et al. (Flow Units From Integrated WFT and NMR Data, Fourth International Reservoir Characterization Technical Conference, p. 319-326, 1997) (Year: 1997).*

"Australian Application Serial No. 2013399120, First Examination Report dated Nov. 1, 2016", 4 pages.

"Canadian Application Serial No. 2,922,076, Office Action dated Mar. 28, 2017", 6 pages.

PCT International Search Report and Written Opinion, dated Jan. 15, 2014, Appl No. PCT/US13/57415, "Static Earth Model Calibration Methods and Systems Using Tortuosity Evaluations," filed Aug. 29, 2013, 14 pgs.

PCT Application Serial No. PCT/US2013/57110, Search Report and Written Opinion dated Mar. 13, 2014, 13 pages.

British Application Serial No. 1601420.1, Second Examination Report dated Jan. 13, 2017., 2 pages.

Australian Application Serial No. 2013399193, First Examination Report dated Oct. 4, 2016., 3 pages.

Canadian Application Serial No. 2,919,633, Office Action dated Nov. 28, 2016., 3 pages.

British Application Serial No. 1601420.1, First Examination Report dated Sep. 2, 2016., 4 pages.

Canadian Application Serial No. 2,919,633; Examinees Letter; dated Oct. 19, 2018, 4 pages.

Singapore Application Serial No. 11201600639R, Search Report and Written Opinion dated Jul. 25, 2016., 6 pages.

GB Application Serial No. 1603386.2, Examination Report Under Section 18(3), dated Nov. 18, 2019, 2 pages.

* cited by examiner

STATIC EARTH MODEL CALIBRATION METHODS AND SYSTEMS USING TORTUOSITY EVALUATIONS

BACKGROUND

Modern oil field operators demand a great quantity of information relating to the parameters and conditions encountered downhole. Among the types of information most sought is permeability, i.e., the ability of a fluid (usually oil, water, gas, etc.) to flow through a geologic formation. The permeability of a reservoir is a function of the interconnectedness of the available pore space, as well as, pore size distribution, flow direction, grain size and sorting, shale content, non-connecting vugs, and fractures. To facilitate characterizing and simulating formation behavior, geologic grids are employed, in which grid cells (blocks) of the geologic grid are assigned values for formation parameters such as porosity, permeability, and/or others. Determining appropriate grid cell sizes and properties is not a trivial task.

BRIEF DESCRIPTION OF THE DRAWINGS

A better understanding of the various disclosed embodiments can be obtained when the following detailed description is considered in conjunction with the attached drawings, in which.

It should be understood that the drawings and detailed description are not intended to limit the disclosed embodiments to the particular forms shown, but on the contrary, the intention is to cover all modifications, equivalents and alternatives falling within the scope of the appended claims.

DETAILED DESCRIPTION

Hydrocarbon production monitoring or planning involves the collection of measured data from within and around the wells of a reservoir. Such data may include, but is not limited to, water saturation, water and oil cuts, fluid pressure and fluid flow rates. As the data is collected, it is archived into a historical database. The collected data, however, mostly reflects conditions immediately around the reservoir wells. To provide a more complete picture of the state of a reservoir, simulations are executed that model the overall behavior of the entire reservoir based on the collected data, both current and historical. These simulations predict the reservoir's overall current state, producing simulated data values both near and at a distance from the wellbores.

The accuracy of reservoir simulation results is limited by the static earth model depicting the subsurface formation as well as various other inputs including: rock-fluid descriptions, and pressure-volume-temperature characterizations. In accordance with at least some embodiments, the disclosed methods and systems calibrate a static earth model using tortuosity evaluations. For example, the disclosed methods and systems may be used to quantify, rank, and display values of tortuosity existing locally between singular injector/producer pairs or globally across a field with multiple injector/producer pairs. As used herein "tortuosity" refers to a ratio computed as an arc length to straight line distance through a medium in the direction of macroscopic flow. The computation of tortuosity may be performed statically, using petrophysical properties defined as a connected geobody and/or dynamically using streamlines. The difference in tortuosity between homogeneous and heterogeneous cases (for both static and dynamic models) indicate the possible effects of rock property heterogeneity, which produce a divergence in the flow path, and/or multiphase flow effects in the dynamic model (e.g., fluid retention due to wettability or isolation due to capillarity). Also, changes in tortuosity may be determined by comparing histograms of tortuosity for respective static and dynamic models to those computed from a given petrophysical realization or post-process streamline bundle. Further, the tortuosity for connected grid cells (reservoir geobodies) may be quantified as an extension to a Rock-Type Flow Unit concept, where the hydraulic conductivity of a porous medium is described according to the flow of two fluid phases with respect to the media and each other respectively. An agglomeration of cells, defined by an equivalent Rock-Type Flow Unit constitutes a connected geobody which in-turn may also be described according to its system tortuosity.

In at least some embodiments, the disclosed methods and systems may obtain a static earth model having a three-dimensional grid with multiple cells. Pluralities of geobodies are determined for the static earth model, where each geobody includes a collection of connected cells. Further, disclosed methods and systems may compute a tortuosity value for at least some of the geobodies. The static earth model is calibrated using at least one of the computed tortuosity values. In an example calibration, grid cell scaling of the static earth model may be updated using static or dynamic tortuosity computed between completion intervals for a well pair or according to a specific direction in the field. In another example calibration, the depositional facies model (geometric depositional facies relationships incorporated in a facies model), which is used as a spatial constraint for the distribution of petrophysical properties, may be calibrated using the tortuosity evaluations. To evaluate tortuosity and perform the calibration, flow paths associated with the static earth model may be quantified and ranked. Further, visual representations related to the tortuosity evaluation may be generated and displayed.

Figure 1:
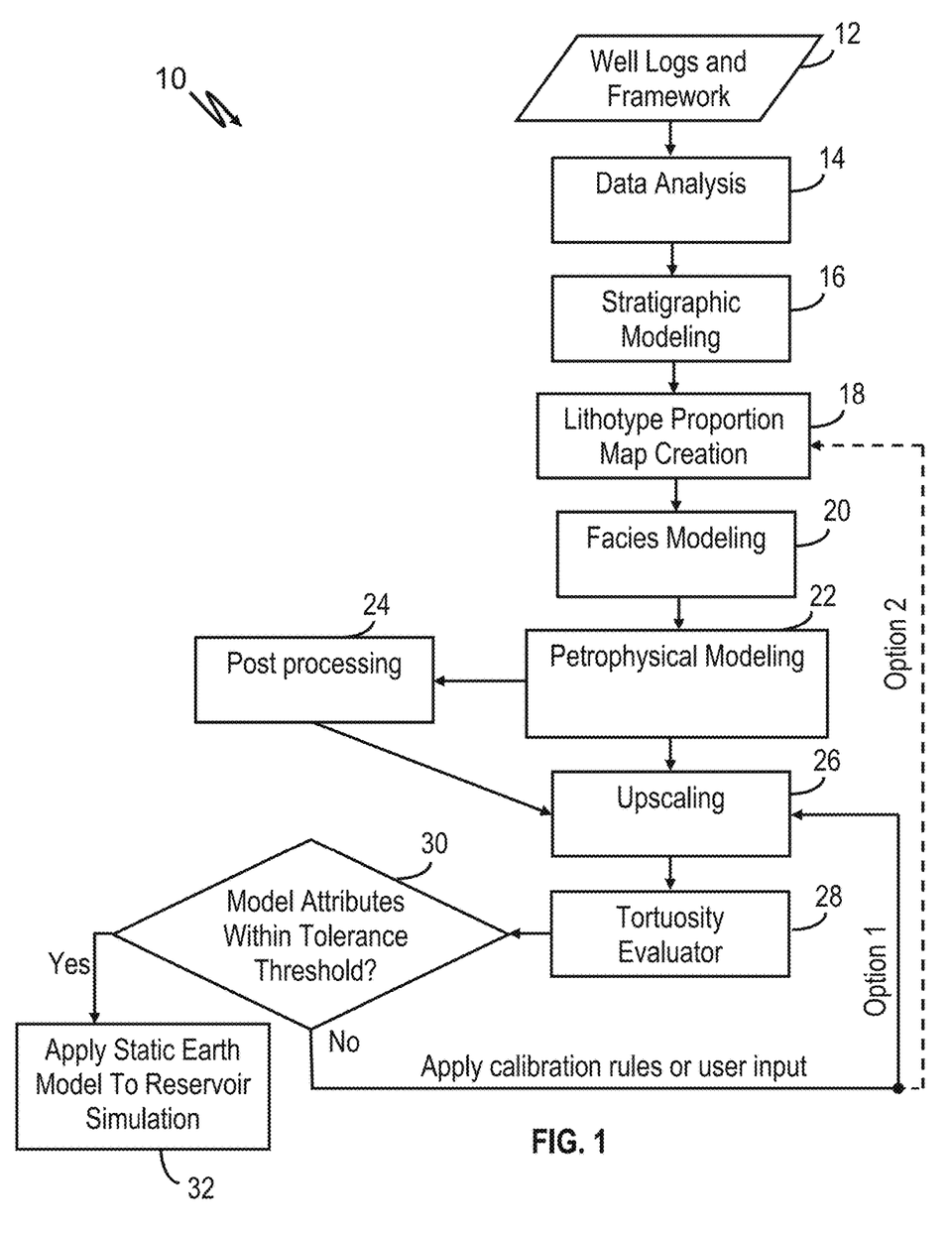
FIG. 1 shows an illustrative process for determining a static earth model.

FIG. 1 shows an illustrative process 10 for determining a static earth model. The process includes a data analysis block 14 that receives well log input from block 12. The well logs correspond to collected data that may include, but is not limited to, porosity, permeability, resistivity, and gamma ray. Here data quality is assessed and outliers are removed such that spurious data is not introduced into the developed model. Block 12 also provides a framework, which corresponds to structural rules for a static earth model based on framework interpretation and knowledge of the depositional environment. The stratigraphic modeling block 16 uses the framework to build a geocellular grid that honors the internal bedding geometries resulting from sedimentation.

At lithotype proportion map creation block 18, a lithotype proportion map that defines grouped proportion curves and/or smoothed lithotype proportions. The generated lithotype proportion map is provided to a facies modeling block 20 that generates one or more depositional facies models (e.g., based on stochastic simulation methods), which may be used as a template for the mathematical distribution of petrophysical properties within a reservoir or formation. For example, in process 10, the one or more facies models are input to a petrophysical modeling block 22, which mathematically distributes petrophysical properties within a static earth model using spatial constraints of the one or more facies models.

In at least some embodiments, the petrophysical features are input to a post processing block 24 that estimates volumetric characteristic such as original oil in place, gross rock volume, and recoverable hydrocarbon. The post processing block 24 also may quantify static property uncertainty characteristics and may execute a single-phase fluid numerical simulation in the static earth model in order to assess the effect of the distributed petrophysical properties and the spatial constraints resulting from the depositional facies.

Petrophysical features determined by petrophysical modeling block 22 and/or post processing information determined by post processing block 24 are input to an upscaling block 26 that determines the grid cells sizes for each of a plurality of grid cells, and computes geological parameter values (e.g., porosity and permeability values) for each grid cell. The upscaling block 26 may use operator input and/or scaling rules to determine a degree of scaling. In at least some embodiments, the grid cell scaling block 26 employs the scaling techniques disclosed in Application Ser. No. PCT/US2013/057110, entitled "Static Earth Model Grid Cell Scaling and Property Re-Sampling Methods and Systems," filed Aug. 28, 2013, and hereby incorporated herein by reference in its entirety.

The static earth model resulting from the operations of blocks 14, 16, 18, 20, 22, and 26 is provided to tortuosity evaluator block 28. In at least some embodiments, tortuosity evaluator block 28 determines static and dynamic tortuosity estimates. More specifically, a static tortuosity estimate can be determined using a static earth model, where Rock-Type Flow units are generated for specific ranges of rock properties, depositional facies and connectivity (face, edges, vertices) filters to create geobodies. The geobodies may be bounded to injection/production wells or may be spatially defined by the geometry of the resulting geobody. The tortuosity of the Rock-Type Flow Units is computed, where the start and end point of the tortuosity calculation for each geobody is dependent on the specified bounding mechanism (wells or geobody spatial extent).

In at least some embodiments, a multi-histogram is plotted for tortuosity estimates. Further, homogeneous case results (where tortuosity is equal to 1) may be compared with heterogeneous case results (where the tortuosity is expected to be a value greater than 1). Further, in at least some embodiments, a probability plot for tortuosity estimates for all geobodies of a particular realization is produced. Further, a probability plot for tortuosity estimates of all realizations (including homogeneous and heterogeneous cases) may be produced. The probability plots and/or other evaluation tools may be used to rank tortuosity for all created Rock-Type Flow Units.

As previously mentioned, the tortuosity evaluator block 28 also determines dynamic tortuosity estimates. In at least some embodiments, dynamic tortuosity estimates are determined as a post-process to numerical flow modeling. For example, a pseudo-grid may be created with identical global and cell dimensions to a heterogeneous rock property model. The grid is populated with identical porosity and permeability throughout. Subsequently, a numerical flow simulation is performed, and streamlines are computed as a post-process. The dynamic tortuosity estimates are determined based on the computed streamlines. Numerical flow simulations and streamlines may be computed for various other heterogeneous rock property models, where porosity and permeability are varied. In some embodiments, a multi-histogram is plotted for all tortuosity evaluation results. Further, homogeneous case results (where tortuosity would be close but not equivalent to the value of 1 since the flow will also take place in circuitous travel paths between injector and producer wells due to applied pressure drop) is compared with heterogeneous case results (where the tortuosity is expected to be a value greater than 1). In some embodiments, a probability plot for tortuosity estimates of all realizations (including homogeneous and heterogeneous cases) may be produced to evaluate the distribution of tortuosity amongst all streamlines computed for the disparate rock property volumes.

At block 30, a determination is made regarding whether attributes of the static earth model are within tolerance thresholds. For example, homogeneous case and heterogeneous case results may be compared. The difference in tortuosity between respective homogeneous and heterogeneous cases (for both static and dynamic models) indicates possible effects of rock property heterogeneity, which produce a divergence in the flow path. Such divergences are due to inter-facies relationships, petrophysical properties, rock-type/hydraulic flow units, and/or multiphase flow effects in the dynamic model (e.g., fluid retention due to wettability, thief zone(s) or isolation due to capillarity). If the attributes of the static earth model are within tolerance thresholds (determination block 30), the static earth model is applied to reservoir simulations or other operations at block 32. Otherwise, the process 10 returns to block 26 (option 1) and/or block 18 (option 2), where calibration rules and/or user input are applied to update the static earth model (e.g., the grid cell scaling and/or geological features of the static earth model may be updated). As an example, the calibration rules and/or user input may adjust the grid cell scaling (upscaling or downscaling) of the static earth model using predetermined connectivity, tortuosity, and/or Euler number values for the next iteration of scaling. Further, the calibration rules and/or user input may adjust lithotype proportions, facies relationships, distribution of petrophysical properties within a defined depositional facies, or other geological features of the static earth model. The process of evaluating tortuosity and updating the static earth model may continue until attributes of the static earth model are determined to be within tolerance thresholds.

Figure 2:
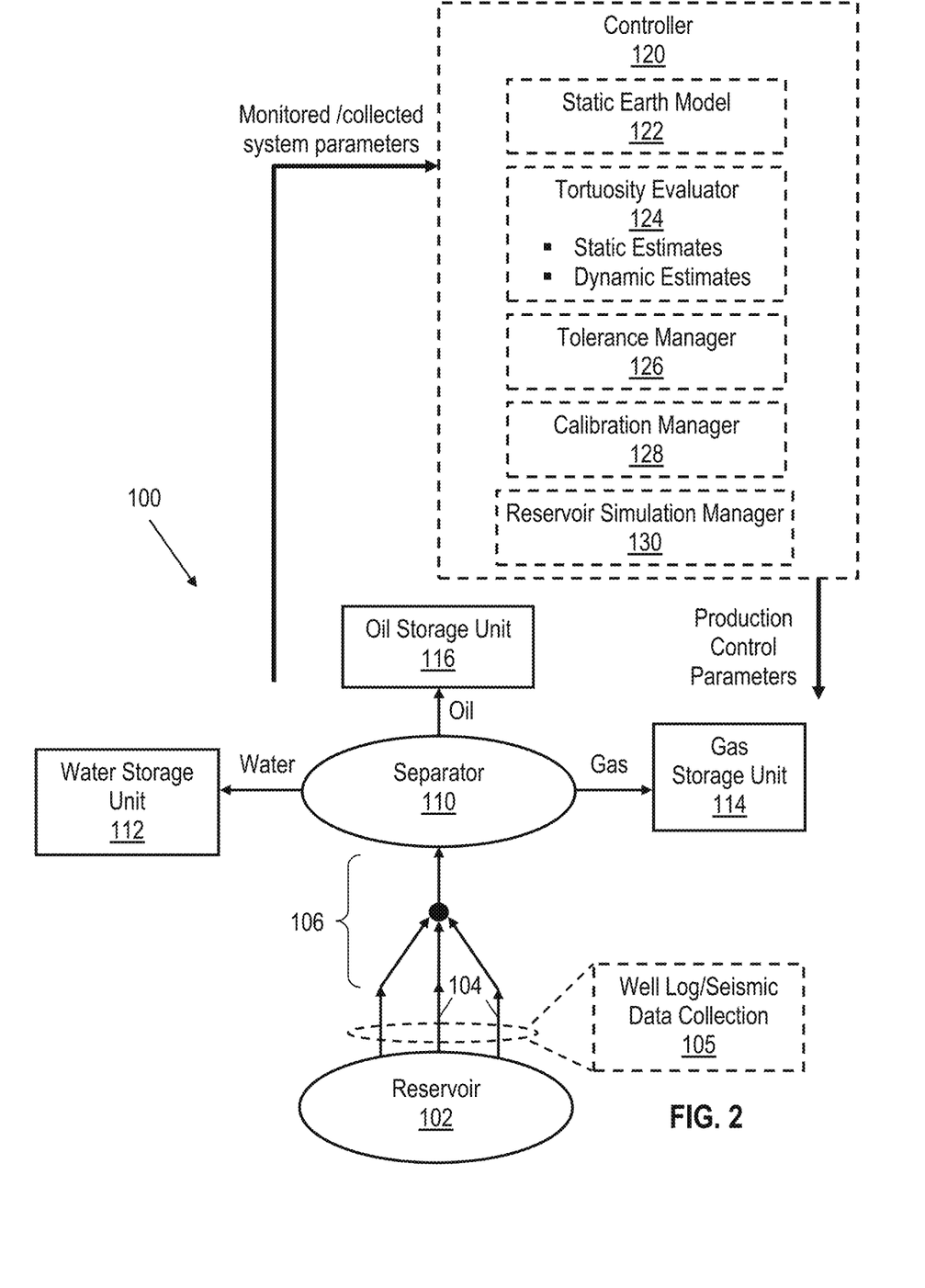
FIG. 2 shows an illustrative hydrocarbon production system.

FIG. 2 shows an illustrative hydrocarbon production system 100. The illustrated hydrocarbon production system 100 includes a collection of wells 104 extending from a reservoir 102, where the arrows representing the wells 104 show the direction of fluid flow (i.e., wells 104 represent production wells). Although only production wells are shown, hydrocarbon production system 100 could also include injector wells. Further, the hydrocarbon production system 100 also includes well log and seismic data collection 105 at wells 104.

In FIG. 2, a surface network 106 transports fluid from the wells 104 to a separator 110, which directs water, oil, and gas to separate storage units 112, 114, and 116. The water storage unit 112 may direct collected water back to reservoir 102 or elsewhere. The gas storage unit 114 may direct collected gas back to reservoir 102, to a gas lift interface (not shown), or elsewhere. The oil storage unit 116 may direct collected oil to one or more refineries. In different embodiments, the separator 110 and storage units 112, 114, and 116 may be part of a single facility or part of multiple facilities associated with the hydrocarbon production system 100. Although only one oil storage unit 116 is shown, it should be understood that multiple oil storage units may be used in the hydrocarbon production system 100. Similarly, multiple water storage units and/or multiple gas storage units may be used in the hydrocarbon production system 100.

In FIG. 2, the hydrocarbon production system 100 includes a controller 120 with various components related to the disclosed methods and systems. The controller 120 represents, for example, one or more computers executing software or other instructions. As shown, the controller 120 receives monitored system parameters from various components of the hydrocarbon production system 100, and determines various production control parameters for the hydrocarbon production system 100. It should be understood that some operations of the controller 120 may be automated, while others involve operator input and/or the accumulation of data or simulation results over time. Further, some operations of controller 120 may be based on a combination of software-based analysis and operator input over a long period of time. Rather than provide information on all the possible control operations of hydrocarbon production system 100, the discussion of controller 120 is limited to its use of various components related to the tortuosity-based calibration techniques described herein. One of ordinary skill in the art would understand that the controller 120 may also perform various other operations in real-time and/or in a time-segmented manner.

In accordance with at least some embodiments, the controller 120 includes a static earth model 122 determined using, for example, one or more of the steps described for process 10 of FIG. 1. The static earth model 122 includes stratigraphic, facies, and petrophysical features as described herein. As shown, the controller 120 also includes a tortuosity evaluator 124 that performs tortuosity evaluations as described herein (see e.g., the operations of tortuosity evaluator block 28 in FIG. 1). More specifically, the tortuosity evaluator 124 may determine, rank, and/or display static tortuosity and dynamic tortuosity estimates as described herein. In response to the tortuosity evaluation results provided by tortuosity evaluator 124, adjustments may be made to the static earth model 122.

In FIG. 2, the controller 120 also includes a tolerance manager 126 that determines whether attributes of the static earth model are within tolerance thresholds as described herein. For example, the tolerance manager 126 may compare static and dynamic tortuosity estimates. Further, the tolerance manager 126 may compare tortuosity estimates for homogeneous and heterogeneous rock property models. If the attributes of the static earth model are not within tolerance thresholds (e.g., the difference between static and dynamic tortuosity estimates is greater than a threshold), calibration manager 128 enables updates to the static earth model 122 based on predetermined tolerance values, calibration rules, and/or a calibration interface. For example, in some embodiments, the grid cell scaling of the static earth model may be adjusted based on the predetermined tolerance values, calibration rules, and/or a calibration interface. In another example calibration, geological features (e.g., lithotype proportions, facies relationships, distribution of petrophysical properties within a defined depositional facies) may be adjusted such that static and dynamic tortuosity estimates more closely match. Further, homogeneous rock properties and/or models may be selected instead of heterogeneous rock properties for a particular region of the static earth model. Similarly, heterogeneous rock properties and/or models may be selected instead of homogeneous rock properties for a particular region of the static earth model. As needed, tortuosity evaluation, tolerance assessment, and calibration operations are performed until attributes of the static earth model are within the tolerance threshold levels maintained by the tolerance manager 126.

As shown, the controller 120 also includes a reservoir simulation manager 130. In at least some embodiments, the static earth model 122 and the reservoir simulation manager 130 are employed to perform fluid flow simulations and/or history matching operations. For example, fluid flow simulation operations may employ a fully implicit method (FIM) that simulates fluid flow using Newton's method to solve a non-linear system of equations. Other methods of modeling reservoir simulation (e.g., the IMPES only method) are also contemplated herein. In the history matching process, the production rates and cumulative produced fluids are simulated using the static earth model 122 as input and are compared with historical production data from the field (e.g., historical data from wells in production within the reservoir and/or individual wells corresponding to the field). The petrophysical properties of the static earth model 122 may then be updated/adjusted in order to obtain a match of simulated results with respect to measured historical data. The need to make adjustments to the petrophysical properties during the history matching process would become diminished as static earth model updates are made (considering the geologic characterization of measured data in the formation as opposed to produced volumes of fluid).

Figure 3:
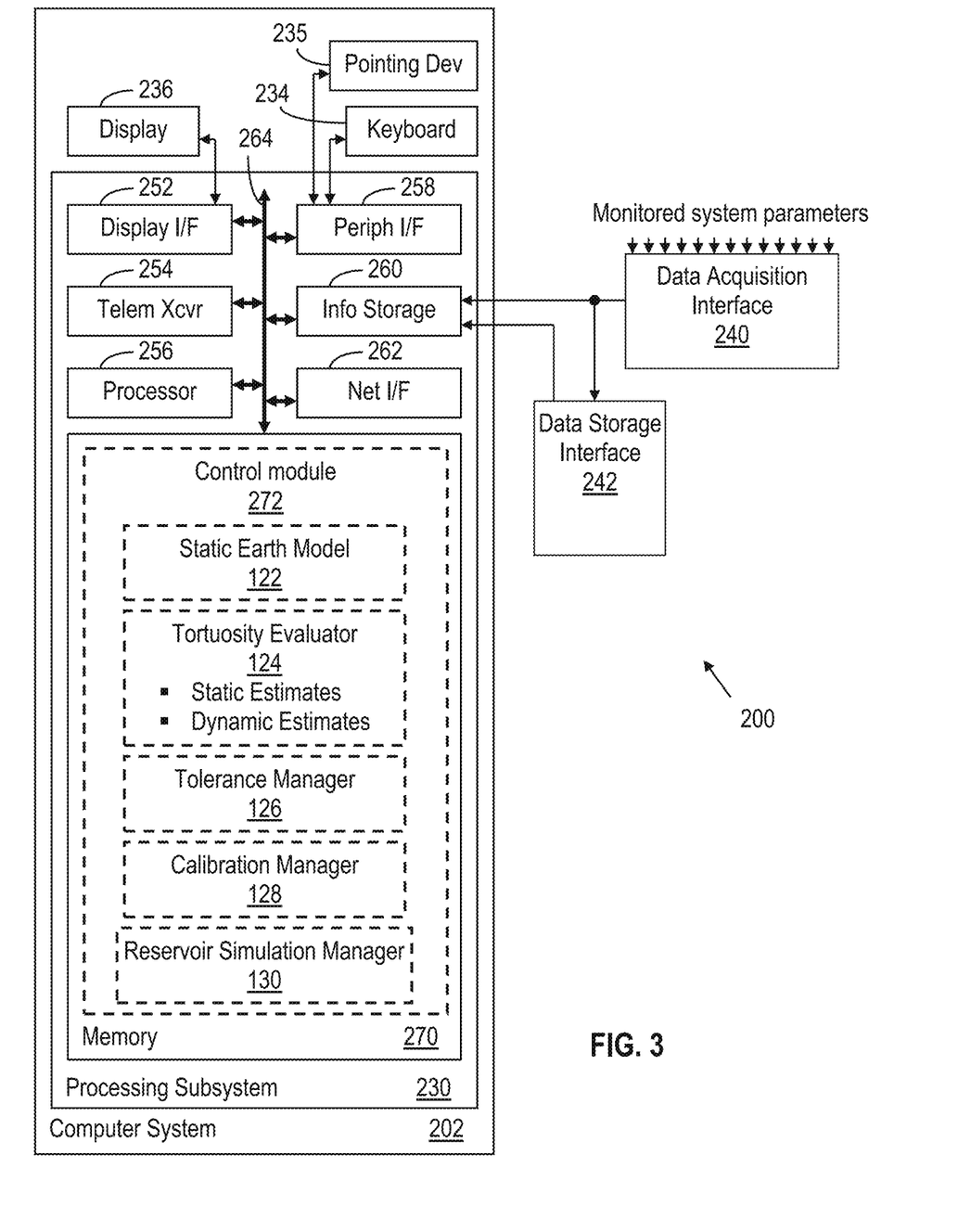
FIG. 3 shows illustrative components for a control system.

FIG. 3 shows illustrative components for a control system 200 that carries out the operations of controller 120. The illustrated components include a computer system 202 coupled to a data acquisition interface 240 and a data storage interface 242. In at least some embodiments, a user is able to interact with computer system 202 via keyboard 234 and pointing device 235 (e.g., a mouse) to perform the static earth model determination and calibration operations described herein.

As shown, the computer system 202 comprises includes a processing subsystem 230 with a display interface 252, a telemetry transceiver 254, a processor 256, a peripheral interface 258, an information storage device 260, a network interface 262 and a memory 270. Bus 264 couples each of these elements to each other and transports their communications. In some embodiments, telemetry transceiver 254 enables the processing subsystem 230 to communicate with downhole and/or surface devices (either directly or indirectly), and network interface 262 enables communications with other systems (e.g., a central data processing facility via the Internet). In accordance with embodiments, user input received via pointing device 235, keyboard 234, and/or peripheral interface 258 is utilized by processor 256 to perform the static earth model determination and tortuosity evaluation operations described herein. Further, instructions/data from memory 270, information storage device 260, and/or data storage interface 242 are utilized by processor 256 to perform the static earth model determination and tortuosity evaluation operations described herein.

As shown, the memory 270 comprises a control module 272. More specifically, the control module 272 includes the static earth model 122 described for FIG. 2. The control module 272 also includes the tortuosity evaluator 124 that enables computer system 202 to perform the tortuosity evaluations operations described herein. The control model 272 also includes tolerance manager 126 to assess whether attributes of the static earth model 122 are within a tolerance threshold. Further, the control module 272 includes the calibration manager 128 to enable update to the static earth model 122 based on predetermined tolerance values, calibration rules, and/or a calibration interface. Further, the control module 272 may employ the reservoir simulation manager 130 to perform fluid flow simulations and/or history matching operations as described herein.

In at least some embodiments, the control module 272, when executed, causes the computer system 202 to perform various steps including: obtaining a static earth model having a three-dimensional grid with multiple cells; determining a plurality of geobodies for the static earth model, each geobody comprising a plurality of connected cells; computing a tortuosity value for each of the plurality of geobodies; and calibrating the static earth model using at least one the computed tortuosity values. Further, in some embodiments, the control module 272, when executed, causes the computer system 202 to compute a tortuosity value based on a static tortuosity estimate and a dynamic tortuosity estimate. More specifically, the control module 272, when executed, may cause the computer system 202 to compute a tortuosity value based on a comparison of a static tortuosity estimate and a dynamic tortuosity estimate. Further, the control module 272, when executed, may cause the computer system 202 to evaluate and/or calibrate a static earth model by quantifying and ranking a plurality of connected petrophysically defined geobodies and hydraulically defined fluid flow paths within the static earth model.

In at least some embodiments, the control module 272, when executed, may cause the computer system 202 to generate a visual representation of tortuosity for at least one geobody of a static earth model. Further, the control module 272, when executed, may cause the computer system 202 to generate a visual representation that compares tortuosity for at least some geobodies of a static earth model. Such visual representations may enable an operator to evaluate tortuosity attributes of the static earth model and to assist with the calibration process. Although the various components 272, 122, 124, 126, 128, and 130 are described as software modules executable by a processor (e.g., processor 256), it should be understood that comparable operations may be performed by programmable hardware modules, application-specific integrated circuits (ASICs), or other hardware.

The static earth model determination and calibration techniques described herein can be related to a three-dimensional array of data values. Such data values may correspond to collected survey data, static earth model data, simulation data, tortuosity evaluation data, and/or other values. Collected survey data, static earth model data, simulation data, and/or tortuosity evaluation data is of little use when maintained in a raw data format. Hence such data is sometimes processed to create a data volume, i.e., a three-dimensional grid of data values such as the data volume 402 of FIG. 4A. The data volume 402 represents a distribution of formation characteristics throughout the survey region. The three-dimensional grid may be comprised of structured or unstructured cells 72, each cell 72 having data values representing one or more formation characteristics for that cell or having a null value. Examples of suitable formation characteristics include porosity, permeability, and density. Further, statigraphic features, facies features, and petrophysical features may be applied to the three-dimensional array to generate a static earth model as described herein. The volumetric data format readily lends itself to computational analysis and visual rendering, and for this reason, the data volume 402 may be termed a "three-dimensional image" of the survey region.

Figure 4A:
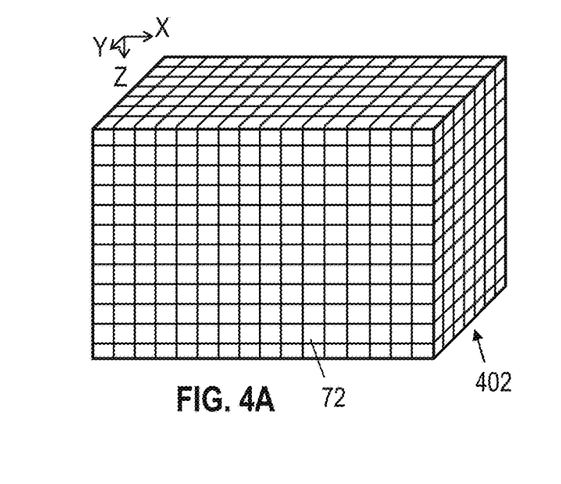
FIG. 4A shows an illustrative data volume in three dimensions.
Figure 4B:
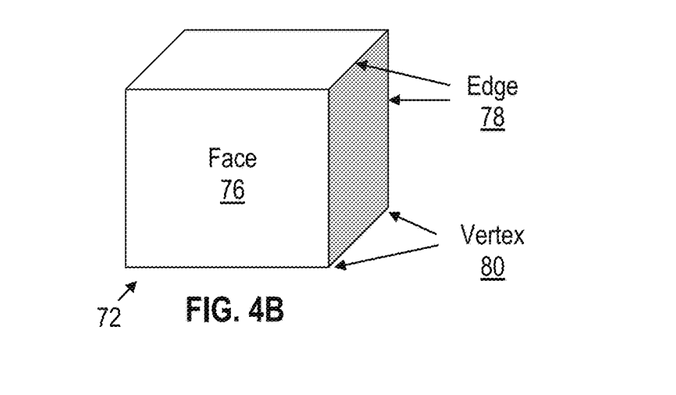
FIG. 4B shows an illustrative cell contained within a data volume.

The grid cells 72 of the data volume 402 may be defined in terms of their geometry. As understood in the art, conjoined cells in a reservoir model grid may be connected by vertices, edges and faces. The data volume 402 is typically comprised of stacked rectilinear/structured sets (i.e., in Cartesian or pseudo-Cartesian space) accounting for stratigraphy and displacement attributed to faulting. To illustrate this feature, FIG. 4B illustrates an exemplary cell 72 of data volume 402, the cell 72 having six faces 76, twelve edges 78 and eight vertices 80 (or corner-point connections).

In at least some embodiments, stacked cell connectivity utilized by controller 120 or control module 272 is determined by defining how or if adjacent faces 76, edges 78 and vertices 80 are connected to one another in the entire volume or in a specified three-dimensional zone of interest. For example, if a particular filter requires that only edges and vertices be connected, those cells not so connected are discarded. In different embodiments, one or more geometrical connectivity filters may be utilized alone or in combination. Once geobody geometries have been defined, controller 120 or control module 272 causes a processor (e.g., processor 256) to traverse the data by incrementing along the X axis, then incrementing along the Y axis and then by incrementing along the Z axis cell by cell, establishing whether the necessary cell connections exist. The function and operation of such geometric connectivity algorithms will be understood by those ordinarily skilled in the art having the benefit of this disclosure.

Figure 4C:
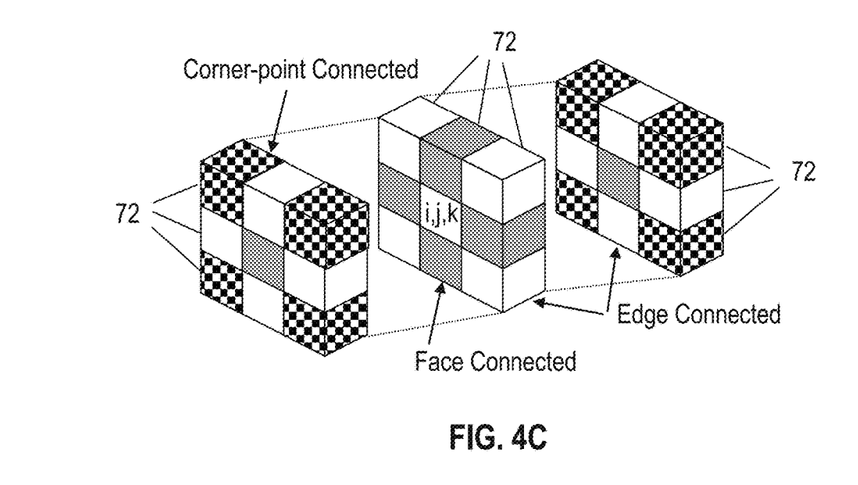
FIG. 4C shows an illustrative series of stacked cells contained within a data volume.

Accordingly, subsurface cell connections may be manifested as face-to-face, edge-to-edge, and vertex-to-vertex. To illustrate this concept, FIG. 4C demonstrates various stacked cells 72 and their interconnectedness that would be assessed with respect to a central cell (i,j,k) within a reservoir grid, as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998). In at least some embodiments, connectivity may be determined from any permutation or exclusive implementation of face, edge or vertex based connectivity between cells 72 within a given volume of the data volume 402.

Figure 4D:
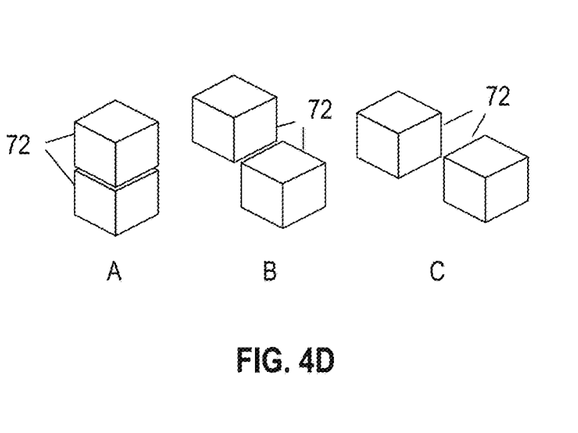
FIG. 4D shows illustrative cell connections.

FIG. 4D illustrates three geometric connectivity methods for cells 72, where A shows face-to-face connectivity, B shows edge-to-edge connectivity, and C shows vertices-to-vertices connectivity, as described in Zhang, M., Yonigjia, H., Ye, G., Lange, D. and van Breugel, K.; *Computational investigation on mass diffusivity in Portland cement paste based on X-ray computed microtomography ($\mu CT$) image;* Construction and Building Materials, Vol. 27, Issue 1, pp. 472-481, 2012). The connectivity algorithm and connection configurations used for static earth model evaluations herein may be, for example, those as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998. However, those ordinarily skilled in the art having the benefit of this disclosure realize there are a variety of other connectivity methodologies which may be utilized with the present invention.

The disclosed static earth model determination and calibration operations may be combined with other production system management operations, where expense and time management efforts are needed. The systems and methods described herein rely in part on measured data collected from production system components such as fluid storage units, surface network components, and wells, such as those found in hydrocarbon production fields. Such fields generally include multiple producer wells that provide access to the reservoir fluids underground. Further, controllable production system components and/or EOR components are generally implemented at each well to throttle up or down the production as needed based on predetermined control criterion. Further, in at least some illustrative embodiments, additional well data is collected using production logging tools to supplement data collected from other sensing/monitoring operations. The production logging tool data may be communicated to a computer system during the logging process, or alternatively may be downloaded from the production logging tool after the tool assembly is retrieved.

Figures 5, 6:
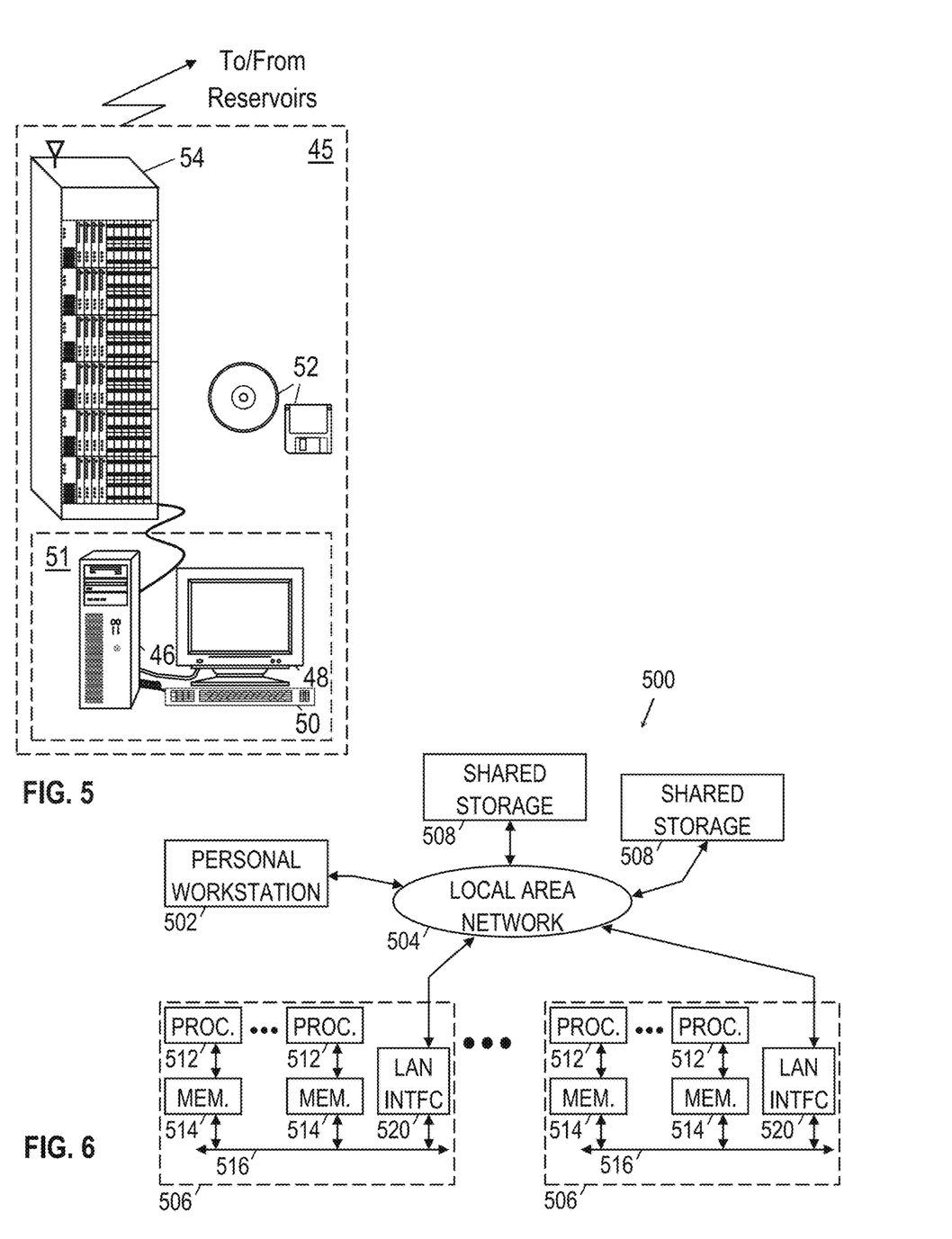
FIG. 5 shows an illustrative computer system to control data collection and production.
FIG. 6 shows an illustrative imaging system.

FIG. 5 shows an example computer system to control data collection and production. In some embodiments, measured well data is periodically sampled and collected from the producer well and combined with measurements from other wells within a reservoir, enabling the overall state of the reservoir to be monitored and assessed. Such wells may forward collected data from the downhole measurement devices and forwards it to a supervisory control and data acquisition (SCADA) system that is part of a processing system such as computer system 45 of FIG. 5. In the illustrative embodiment shown, computer system 45 includes a blade server-based computer system 54 that includes several processor blades, at least some of which provide the above-described SCADA functionality. Other processor blades may be used to implement the disclosed static earth model determination and calibration systems and methods. Computer system 45 also includes user workstation 51, which includes a general purpose processor 46. Both the processor blades of blade server 54 and general purpose processor 46 are preferably configured by software, shown in FIG. 5 in the form of removable, non-transitory (i.e., non-volatile) information storage media 52, to process collected well data within the reservoirs and data from a gathering network (described below) that couples to each well and transfers product extracted from the reservoirs. The software may also include downloadable software accessed through a communication network (e.g., via the Internet). General purpose processor 46 couples to a display device 48 and a user-input device 50 to enable a human operator to interact with the system software 52. Alternatively, display device 48 and user-input device 50 may couple to a processing blade within blade server 54 that operates as general purpose processor 46 of user workstation 51.

FIG. 6 shows an illustrative imaging system 500 for displaying a static earth model, simulations results, tortuosity evaluation results, or related data. In FIG. 6, the imaging system 500 includes a personal workstation 502 coupled via a local area network (LAN) 504 to one or more multi-processor computers 506, which are in turn coupled via the LAN to one or more shared storage units 508. Personal workstation 502 serves as a user interface to the processing system, enabling a user to load survey data, static earth model data, and/or simulation data into the system, to retrieve and view image data from the system, and to configure and monitor the operation of the processing system. Personal workstation 502 may take the form of a desktop computer with a graphical display that graphically shows survey data, static earth model data, tortuosity evaluation data, simulation data, and/or images of a corresponding region. The personal workstation 502 also may include input devices (e.g., keyboard and mouse) that enable the user to move files and execute processing software.

LAN 504 provides high-speed communication between multi-processor computers 506 and with personal workstation 502. The LAN 504 may take the form of an Ethernet network. Meanwhile, multi-processor computer(s) 506 provide parallel processing capability to enable suitably prompt conversion of static earth model data, raw data signals, simulation data, and/or tortuosity evaluation data into a region image. Each computer 506 includes multiple processors 512, distributed memory 514, an internal bus 516, and a LAN interface 520. Each processor 512 operates on an allocated portion of the input data to produce a partial image of a corresponding region. Associated with each processor 512 is a distributed memory module 514 that stores conversion software and a working data set for the processor's use. Internal bus 516 provides inter-processor communication and communication to the LAN networks via interface 520. Communication between processors in different computers 506 can be provided by LAN 504.

Shared storage units 508 may be large, stand-alone information storage units that employ magnetic disk media for nonvolatile data storage. To improve data access speed and reliability, the shared storage units 508 may be configured as a redundant disk array. Shared storage units 508 initially store a data volume such as data volume 402. The matrix values and/or image volumes can be stored on shared storage units 508 for later processing. In response to a request from the workstation 502, the image volume data can be retrieved by computers 506 and supplied to workstation 502 for conversion to a graphical image to be displayed to a user.

Figure 7A:
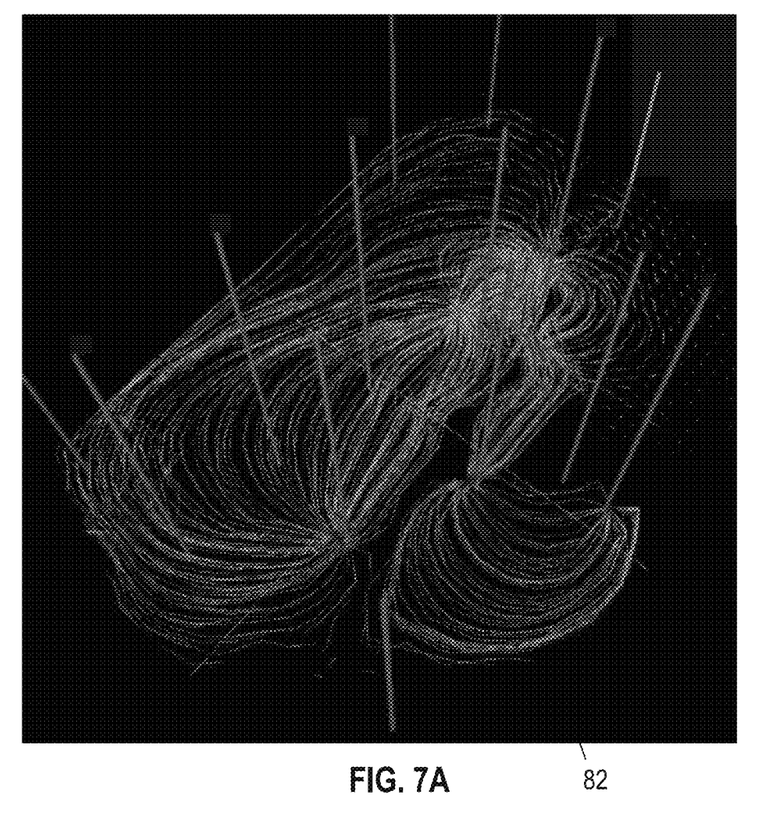
FIGS. 7A-7D shows illustrative graphical representations related to tortuosity evaluations.
Figure 7B:
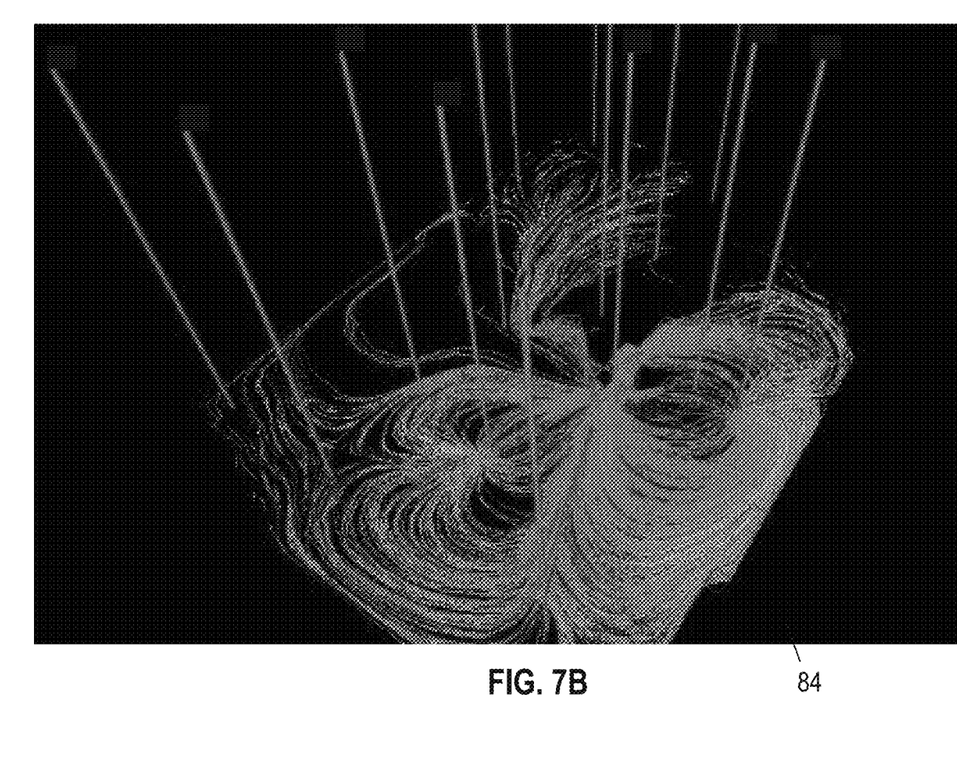

FIGS. 7A-7D show illustrative visual representations related to tortuosity evaluations. In FIGS. 7A and 7B, plots 82 and 84 shows fluid flow streamlines between various injector wells and production wells in a region of interest. The configuration of streamlines between different injector and producer well pairs is a result of distributed petrophysical properties and applied pressure gradients existing between well pairs. Thus, the differences between FIGS. 7A and 7B are due to disparate injection/production pairs being used in the simulation process and the resulting pressure gradients applied between injector and producer wells.

Figure 7C:
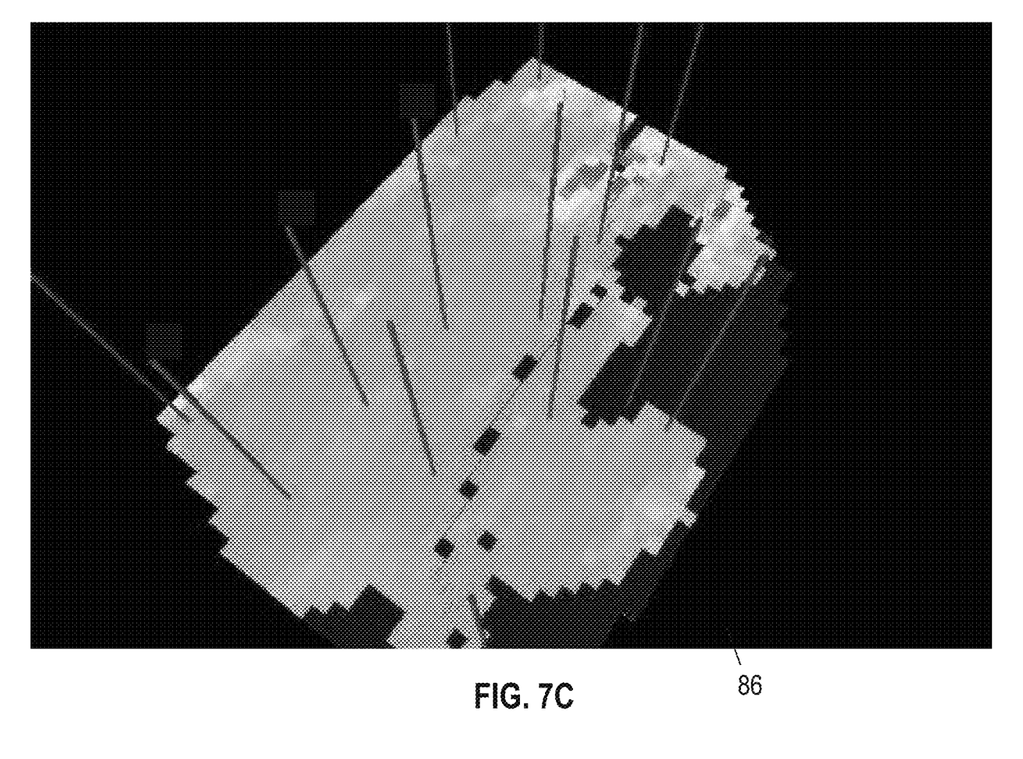
Figure 7D:
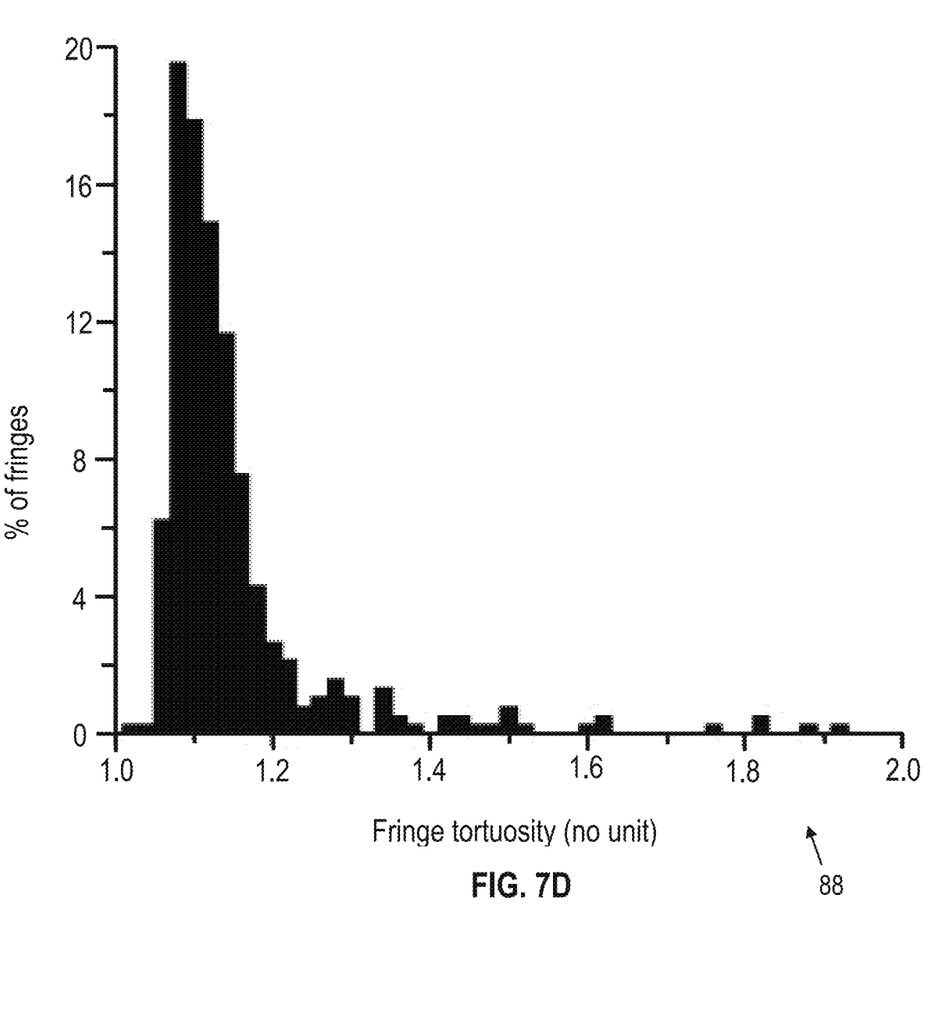

In FIG. 7C, plot 86 shows formation features related to a region of interest. Such formation features enable subsurface characterization, analysis and management of formation properties such as porosity, permeability, resistivity, bulk density, facies, fluid saturation, or pressure. In FIG. 7D, histogram 88 shows a comparison for a % of fringes and fringe tortuosity for a region of interest. It should be noted that tortuosity has a lower bound of 1.0 for an isotropic/homogenous volume but the upper bound on the distribution of tortuosity is dependent on the variability of petrophysical and/or flow unit paths in the volume. As a result, three-dimensional digital volumes with tortuosity approaching 1.0, as a lower bound, are well connected and may be defined as being homogenous/isotropic.

In addition to the features shown in FIGS. 7A-7D, visual representations related to tortuosity evaluations may use color, shapes, and/or alphanumeric data to represent porosity, fault lines, and/or other features. In some embodiments, static and dynamic tortuosity values may also be used to determine timing information for fluid flows given that, for a defined pressure gradient in a bounded system, fluid flow occurring along a circuitous path has a greater travel time than that of a fluid traveling in a straight (unaltered) path. In at least some embodiments, a static earth model may be calibrated, in part, based on the information provided in such visual representations. As an example, inter-facies relationships defined in a facies modeling process may be revised in accordance with user input (e.g., to select desired system or inter-well communication parameters) or interpretation of data.

Figure 8:
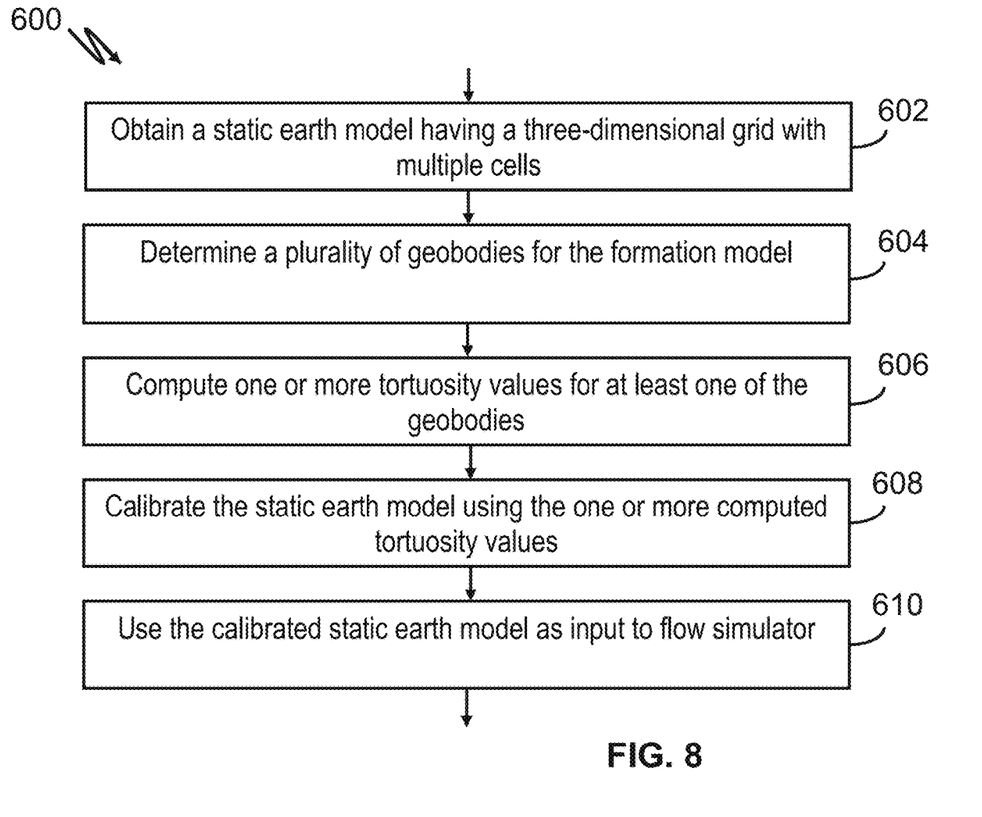
FIG. 8 shows an illustrative static earth model calibration method.

FIG. 8 shows an illustrative method 600. The method 600 may be performed, for example, by controller 120 of FIG. 2, computer system 202 of FIG. 3, computer system 45 of FIG. 5, or computers 502 and/or 506 of FIG. 6. As shown, the method 600 includes obtaining a static earth model having a three-dimensional grid with multiple cells at block 602. At block 604, a plurality of geobodies are determined for the static earth model, each geobody comprising a plurality of connected cells. At block 606, a tortuosity value is computed for each of the plurality of geobodies. At block 608, the static earth model is calibrated using at least one of the computed tortuosity values. As an example, calibrating the static earth model may involve adjusting its grid cell scaling and/or geological features as described herein. At block 610, the calibrated static earth model is used as input to a flow simulator and/or for other operations.

In at least some embodiments, the method 600 includes additional steps. For example, the method 600 may include computing at least one of the tortuosity values based on a first tortuosity estimate and a second tortuosity estimate. In some embodiments, the first tortuosity estimate may be based on a static earth model and the second tortuosity estimate may be based on a dynamic reservoir model. Further, the method 600 may include comparing the first tortuosity estimate and the second tortuosity estimate. Further, the method 600 may include updating the static earth model based on the comparison. Further, the method may include quantifying and ranking a plurality of flow paths of the static earth model using computed tortuosity values.

In at least some embodiments, the method 600 also may include associating at least one of the plurality of geobodies with a well pair. Further, the method 600 may include generating a visual representation of at least part of a grid and of tortuosity for at least one of the plurality of geobodies. Further, the method 600 may include generating a visual representation that compares tortuosity for at least some of the plurality of geobodies. FIGS. 7A-7D shows example visual representations where tortuosity is represented as a streamline, or bars of a chart, etc. The tortuosity estimates, flow path ranks, well pair associations, visual representations, and/or other tortuosity evaluation data may be utilized to assess attributes of the static earth guide and/or to guide calibration efforts.

Numerous other modifications, equivalents, and alternatives, will become apparent to those skilled in the art once the above disclosure is fully appreciated. For example, although at least some software embodiments have been described as including modules performing specific functions, other embodiments may include software modules that combine the functions of the modules described herein. Also, it is anticipated that as computer system performance increases, it may be possible in the future to implement the above-described software-based embodiments using much smaller hardware, making it possible to perform the described static earth model determination and calibration operations using on-site systems (e.g., systems operated within a well-logging truck located at the reservoir). Additionally, although at least some elements of the embodiments of the present disclosure are described within the context of monitoring real-time data, systems that use previously recorded data (e.g., "data playback" systems) and/or simulated data (e.g., training simulators) are also within the scope of the disclosure. It is intended that the following claims be interpreted to embrace all such modifications, equivalents, and alternatives where applicable.

What is claimed is:

1. A method comprising:
generating a static earth model having a three-dimensional grid with multiple cells;
determining a plurality of geobodies for the static earth model, each geobody comprising a plurality of connected cells;
computing one or more tortuosity values for at least one of the plurality of geobodies, wherein computing the one or more tortuosity values comprises determining a first tortuosity estimate based on a static tortuosity evaluation and a second tortuosity estimate based on a dynamic tortuosity evaluation, wherein determining the second tortuosity estimate comprises generating a reservoir simulation model including,
generating a grid having global and cell dimensions of a heterogeneous rock property model; and
populating the grid with identical porosity and permeability throughout the grid;
comparing the first tortuosity estimate and the second tortuosity estimate; and
calibrating the static earth model based, at least in part, on the comparison.

2. The method of claim 1, wherein calibrating the static earth model comprises adjusting a grid cell scaling of the static earth model.

3. The method of claim 1, further comprising associating at least one of the plurality of geobodies with a well pair.

4. The method of claim 1, further comprising generating a visual representation of at least part of the grid and of tortuosity for at least one of the plurality of geobodies.

5. The method of claim 1, further comprising generating a visual representation that compares tortuosity for at least some of the plurality of geobodies.

6. The method of claim 1, wherein said calibrating the static earth model includes quantifying and ranking a plurality of flow paths of the static earth model.

7. A hydrocarbon production control system, comprising:
a memory having a control program; and
one or more processors coupled to the memory, wherein the control program, when executed, causes the hydrocarbon production control system to:
determine a plurality of geobodies for a static earth model, each geobody comprising a plurality of connected cells;
compute one or more tortuosity values for at least one of the plurality of geobodies, wherein the control program being executable to cause the hydrocarbon production control system to compute the one or more tortuosity values comprises the control program executable to cause the hydrocarbon production control system to determine a first tortuosity estimate based on a static tortuosity evaluation and a second tortuosity estimate based on a dynamic tortuosity evaluation, wherein the control program being executable to cause the hydrocarbon production control system to determine the second tortuosity estimate comprises the control program executable to cause the hydrocarbon production control system to generate a reservoir simulation model including, the control program being executable to cause the hydrocarbon production control system to generate a grid having global and cell dimensions of a heterogeneous rock property model; and the control program being executable to cause the hydrocarbon production control system to populate the grid with identical porosity and permeability throughout the grid;

compare the first tortuosity estimate and the second tortuosity estimate; and calibrate the static earth model based, at least in part, on the comparison.

8. The system of claim 7, wherein the control program, when executed, causes the one or more processors to quantify and rank a plurality of flow paths of the static earth model.

9. The system of claim 7, wherein the control program, when executed, causes the one or more processors to calibrate the static earth model by adjusting a grid cell scaling of the static earth model.

10. A non-transitory computer-readable medium that stores software for generating a cellular three-dimensional model of a formation, wherein the software, when executed, causes a computer to:

determine a plurality of geobodies for a static earth model, each geobody comprising a plurality of connected cells;

compute one or more tortuosity values for at least one of the plurality of geobodies, wherein the software to compute the one or more tortuosity values comprises the software being executable to cause the computer to determine a first tortuosity estimate based on a static tortuosity evaluation and a second tortuosity estimate based on a dynamic tortuosity evaluation, wherein the software to determine the second tortuosity estimate comprises the software being executable to cause the computer to generate a reservoir simulation model including, the software being executable to cause the computer to generate a grid having global and cell dimensions of a heterogeneous rock property model; and the software being executable to cause the computer to populate the grid with identical porosity and permeability throughout the grid;

compare the first tortuosity estimate and the second tortuosity estimate; and calibrate the static earth model based, at least in part, on the comparison.

11. The non-transitory computer-readable medium of claim 10, wherein the software, when executed, causes the computer to generate a visual representation of tortuosity for at least one of the plurality of geobodies, and wherein a user adjusts a grid cell scaling or geological feature of the static earth model based on the visual representation.

12. The non-transitory computer-readable medium of claim 10, wherein the software, when executed, causes the computer to quantify and rank a plurality of petrophysical connections or fluid flow paths of the static earth model, and wherein a user adjusts a grid cell scaling or geological feature of the static earth model based on the rankings.

13. The method of claim 1, wherein said calibrating the static earth model includes quantifying and ranking two or more of the geobodies within the static earth model.

14. The method of claim 1, wherein the dynamic tortuosity evaluation of the second tortuosity estimate comprises computing streamlines based on a numerical simulation performed on the reservoir simulation model and determining dynamic tortuosity estimates based on the computed streamlines.

* * * * *